United States Patent [19]

Parker et al.

[11] Patent Number: 4,816,211
[45] Date of Patent: Mar. 28, 1989

[54] NUCLEAR EXCITED POWER GENERATION SYSTEM

[76] Inventors: Robin Z. Parker, 10965 SW. 95th St., Miami, Fla. 33176; John D. Cox, 3416 SE. 29 Blvd., Gainsville, Fla. 32601

[21] Appl. No.: 785,672

[22] Filed: Oct. 9, 1985

[51] Int. Cl.[4] .............................................. G21C 23/00
[52] U.S. Cl. ...................................... 376/323; 60/649; 60/673; 204/157.44; 204/157.48; 376/354
[58] Field of Search ................... 60/649, 673; 376/323, 376/324, 354, 901; 204/157.44, 157.48; 423/487

[56] References Cited

U.S. PATENT DOCUMENTS

| Re. 31,697 | 10/1984 | Gomberg et al. | 376/323 |
|---|---|---|---|
| 3,039,948 | 6/1962 | Krucoff | 376/354 |
| 3,998,205 | 12/1976 | Scragg et al. | 60/641.15 |
| 4,024,715 | 5/1977 | Scragg et al. | 60/641.15 |
| 4,026,112 | 5/1977 | Scragg et al. | 60/641.8 |
| 4,070,861 | 1/1978 | Scragg et al. | 60/649 |
| 4,097,348 | 6/1978 | Gomberg | 376/324 |
| 4,426,354 | 1/1984 | Scragg et al. | 376/323 |
| 4,620,907 | 11/1986 | Gomberg | 204/157.48 |

FOREIGN PATENT DOCUMENTS

| 3401360 | 8/1985 | Fed. Rep. of Germany | 204/157.48 |
|---|---|---|---|
| 0021596 | 2/1976 | Japan | 204/157.48 |

Primary Examiner—Deborah L. Kyle
Assistant Examiner—Richard W. Wendtland
Attorney, Agent, or Firm—Cushman, Darby & Cushman

[57] ABSTRACT

A nuclear excited power system includes a gaseous core nuclear reactor through the core of which helium is passed. The helium is excited by the high energy radiation from the nuclear reactor and is coupled to a reaction chamber wherein the high energy helium mixes with hydrogen and a halogen, such as, chlorine. The energy thus transferred to the hydrogen and chlorine causes the hydrogen and chlorine to combine to form a hydrogen chloride plasma. The high temperature, high pressure hydrogen chloride plasma drives a turbine, magnetohydrodynamic generator or other electromechanical device to form electrical and/or mechanical energy. The helium and hydrogen chloride exhaust products are separated with the helium coupled back to the reactor core. The hydrogen chloride is disassociated and coupled back to the reaction chamber.

7 Claims, 1 Drawing Sheet

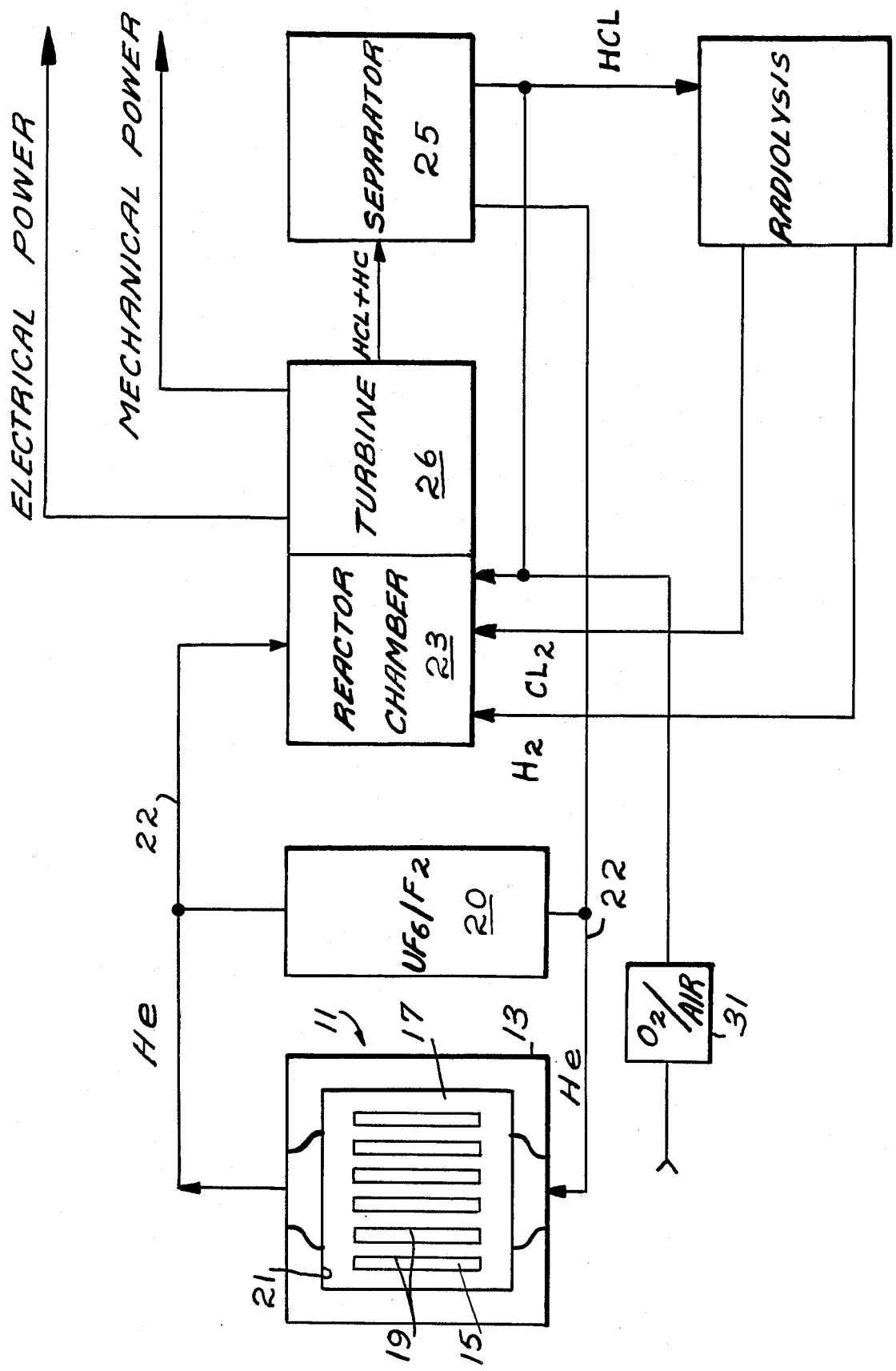

NUCLEAR EXCITED POWER GENERATION SYSTEM

BACKGROUND OF THE INVENTION

This invention relates to a system for generating electromechanical power by converting the energy in a gaseous core nuclear reactor to a high pressure, high temperature hydrogen halide plasma.

This application is related to the following U.S. Patents:

Scragg et al, U.S. Pat. No. 4,426,354;
Scragg et al, U.S. Pat. No. 4,070,861;
Scragg et al, U.S. Pat. No. 4,026,112;
Scragg et al, U.S. Pat. No. 4,024,715; and
Scragg et al, U.S. Pat. No. 3,998,205.

As disclosed in the aforementioned U.S. patents, it is known to convey controlled amounts of hydrogen and chlorine to a chamber which is exposed to high frequency electromagnetic radiation such as derived from sun or from an artificial light source. The chlorine molecules are broken up into atomic chlorine with some chlorine being ionized. The atomized and ionized chlorine combine with hydrogen atoms to form hydrogen chloride. The hydrogen chloride is formed in an exothermic reaction which results in the temperature of the hydrogen chloride being substantially higher than that of the chlorine or hydrogen molecules conveyed to the reactor chamber. The resulting high temperature, high pressure gas is utilized to drive an output device such as a turbine.

Such a system requires a substantial amount of high energy-electromagnetic radiation. This is not available from the sun unless a concentrator is utilized. Further, even with a concentrator, the sunlight is not continuously available and the level of the sunlight changes with the seasons and with weather. To solve this problem the aforementioned Scragg et al, U.S. Pat. No. 4,426,354 is directed to a system wherein high energy radiation from a nuclear reaction reactor is conveyed to the electromagnetic chamber. The radiation from the nuclear reactor includes alpha particles and gamma radiation which provides sufficient radiation to generate the desired energy level for the hydrogen and chlorine reaction.

In a copending patent application of Scragg et al, Ser. No. 646,217 filed Aug. 31, 1984, a nuclear power generation system is disclosed wherein hydrogen chloride is formed. In that system helium is passed through the core of a nuclear reactor and the helium gases are utilized to drive a turbine or steam generator. In addition, chlorine is passed in proximity to the nuclear reactor core so that it is exposed to the electromagnetic and thermal radiation produced by the nuclear reactor. The chlorine is excited and when coupled to a reaction chamber combines with hydrogen to form HCl. The hot HCl gases are utilized to drive a turbine or similar such device. In that system, the helium and chlorine are separate from one another and were utilized to drive turbines or other electromechanical devices separately from one another.

SHORT STATEMENT OF THE INVENTION

It accordingly is an object of the invention to provide an improved method and apparatus for supplying high energy radiation to helium or hydrogen in a gaseous core nuclear reactor wherein the helium or hydrogen is directly coupled to a reactor chamber for energizing chlorine and hydrogen in the formation of hydrogen chloride.

Helium or hydrogen is passed through the core of a gaseous core nuclear reactor and is radiated with electromagnetic energy and high energy particles to greatly increase the temperature of the helium or hydrogen. The helium or hydrogen gases are converted to a plasma and coupled to a reaction chamber outside of the reactor core. The high temperature helium or hydrogen energizes the chlorine in the reactor chamber to form a high temperature, high velocity hydrogen chloride plasma. The energy thus produced in forming the hydrogen chloride plasma is extracted by a magnetohydrodynamic generator and/or a turbine or other conventional energy conversion system to perform useful work in power generation.

BRIEF DESCRIPTION OF THE DRAWING

Other objects, features and advantages of the present invention will become more fully apparent for the following detailed description of the preferred embodiment, the appended claims, and the accompanying drawing which illustrates, in schematic block diagram form, the preferred embodiment of the present invention.

DETAILED DESCRIPTION OF THE PREFERRED EMBODIMENT

Refer now to the FIG. which is a schematic illustration in simplified form of the preferred embodiment of the present invention. Illustrated in schematic form is a heterogeneous gas core reactor 11 which includes a reactor pressure vessel 13, a gaseous core 17 with its array of moderator channels or cells 19, and a surrounding reflector region 21. In the preferred embodiment the gaseous core reactor uses graphite 15 as the moderator. The number, size and spacing of the moderator channels within the core region are determined by the specific gaseous core reactor design taking into consideration the desired operating conditions and intended application for the reactor. A gaseous fuel, such as, a mixture of uranium hexafluoride and helium fills the core cavity. As known in the art, the addition of helium to the gaseous fuel, $UF_6$, enhances its thermodynamic, fluid dynamic and heat transfer properties.

A separate conduit 22 passes through the core and is connected at one end to a reactor chamber 23 and at the other end to a helium separator 25. The separator removes the helium from the hydrogen chloride formed in the reactor chamber 23. The helium is coupled back to the reactor core by the conduit 22. The helium is passed through the core 17 wherein the helium is subjected to the high frequency electromagnetic radiation of the nuclear core. The temperature of the hydrogen and helium is increased sufficiently to form a plasma wherein the helium is ionized and forms alpha particles. A $UF_6/F_2$ separator 20 is provided to separate out the uranium hexafluoride and fluorine which enter the conduit 22. The helium and alpha particles are then coupled to the reactor chamber 23 which is preferably of the type disclosed and illustrated in U.S. Pat. Nos. 4,070,861; 4,026,112; 4,024,715 and 3,998,205. In the reactor, the helium plasma is mixed with chlorine and hydrogen. The high energy from the helium is conveyed to the chlorine and hydrogen wherein the hydrogen and chlorine is combined in an exothermic reaction.

The high pressure, high temperature hydrogen chloride thus formed and the helium is exhausted to a device such as turbine 26 and MHD Generator 24 for converting the hot exhaust gases to mechanical and/or electrical energy. The turbine must be designed to withstand the highly corrosive hydrogen chloride. The output of the turbine drives a suitable power output device, such as, an electrical generator. The hydrogen chloride and helium is then coupled to the helium separator 25 wherein the helium is separated out and coupled back to the nuclear reactor core. The remaining hydrogen chloride is then coupled from the turbine to a disassociation cell 27. The disassociation cell 27 may be, for example, a photolysis cell, a radiolysis cell or an electrolysis cell. These cells are commonly known in the art and will generate molecular hydrogen and chlorine. The molecular hydrogen and chlorine are controllably coupled back to the reactor chamber as the reactants therein.

In an alternative embodiment hydrogen or a combination of hydrogen and helium is passed through the separate conduit 22. The hydrogen or hydrogen-helium mixture absorbs high energy radiation from the gaseous core 17. The high energy helium or helium-hydrogen mixture is supplied to the reactor chamber wherein a halogen, such as chlorine and the hydrogen combine in an exothermic reaction to form a hydrogen chloride plasma. The high temperature, high pressure hydrogen chloride plasma is utilized to drive an output device such as a turbine and/or MHD generator for the purpose of generating electrical or mechanical energy.

The exhausted hydrogen chloride or hydrogen is supplied to a hydrogen separator 25 wherein the hydrogen is separated from the hydrogen chloride and supplied back to the conduit 22. In addition, as aforementioned, the hydrogen chloride is disassociated and the hydrogen is also supplied back to the conduit 22. The chlorine is directly supplied back to the reactor chamber 23. If hydrogen is used as a energy transfer gas in the reactor core, care must be taken that it does not combine with the fluorine of the fuel uranium hexaflouride.

A controlled amount of HCl is preferably coupled back to the reactor chamber 23 in order to modulate or control the amount of energy generated therein. As an alternative or in addition oxygen or air can be coupled to the reaction chamber 23 by way of a control valve 31. This, again, is to control the level of energy generated in the reaction chamber 23. Techniques for controlling the amount of HCl and/or air or oxygen to the chamber are known to those skilled in the art.

By the present invention, a system has been provided for directly coupling nuclear excited helium or hydrogen to a reactor chamber for forming a high temperature or high pressure hydrogen chloride plasma which may be utilized in connection with the generation of electrical and/or mechanical power.

While the present invention has been disclosed in connection with the preferred embodiments thereof it should be appreciated that other embodiments of the invention may be contemplated which fall within the spirit and scope of the invention as defined by the appended claims.

What is claimed is:

1. A power generation system comprising:
   a gaseous core nuclear reactor;
   means for passing helium through said gaseous core nuclear reactor, said helium being excited and forming alpha particles by high frequency radiation from the core of said gaseous core nuclear reactor;
   a reaction chamber;
   means for coupling said excited helium and lapha particles to said reaction chamber;
   means for coupling chlorine and hydrogen to said reaction chamber, said helium and alpha particles energizing said chlorine and hydrogen in said reaction chamber to thereby cause said hydrogen and chlorine to form a high temperature, high pressure hydrogen chloride plasma;
   means for converting said high temperature, high pressure hydrogen chloride plasma to electromechanical energy;
   means for separating said helium from said hydrogen chloride and for coupling said helium back to said gaseous core nuclear reactor; and
   means for disassociating said hydrogen chloride to form molecular hydrogen and chlorine, said molecular hydrogen and chlorine being coupled back to said reaction chamber in a closed loop.

2. A power generation system comprising:
   a gaseous core nuclear reactor;
   means for passing helium through said gaseous core nuclear reactor, said helium being excited and forming alpha particles by high frequency radiation from the core of said gaseous core nuclear reactor;
   a reaction chamber;
   means for coupling said excited helium and alpha particles to said reaction chamber;
   means for coupling halogen and hydrogen to said reaction chamber, said helium and alpha particles energizing said halogen and hydrogen in said reaction chamber to thereby cause said hydrogen and halogen to form a high temperature, high pressure hydrogen halide plasma;
   means for converting said high temperature, high pressure hydrogen halide plasma to electromechanical energy;
   means for separating said helium from said hydrogen halide and for coupling said helium back to said gaseous core nuclear reactor; and
   means for disassociating said hydrogen halide to form molecular hydrogen and halogen, said molecular hydrogen and halogen being coupled back to said reaction chamber in a closed loop.

3. The power generation system of claim 2 wherein said means for passing hydrogen through said gaseous core nuclear reactor includes means for passing helium through said nuclear reactor; and
   means for separating said helium from said hydrogen chloride and for coupling back said helium to said gaseous core nuclear reactor.

4. A power generation system comprising:
   a gaseous core nuclear reactor;
   means for passing hydrogen through said gaseous core nuclear reactor, said hydrogen being excited by high frequency radiation from the core of said gaseous core nuclear reactor;
   a reaction chamber;
   means for coupling said excited hydrogen to said reaction chamber;
   means for coupling chlorine to said reaction chamber, said hydrogen energizing said chlorine in said reaction chamber to thereby cause said hydrogen and chlorine to form a high temperature, high pressure hydrogen chloride plasma;

means for converting said high temperature, high pressure hydrogen chloride plasma to electromechanical energy;

means for disassociating said hydrogen chloride to form molecular hydrogen and chlorine, said molecular chlorine being coupled back to said reactor chamber in a closed loop; and means for coupling said hydrogen back to said gaseous core nuclear reactor in a closed loop.

5. A power generation system comprising:

a gaseous core nuclear reactor;

means for passing hydrogen through said gaseous core nuclear reactor, said hydrogen being excited by high frequency radiation from the core of said gaseous core nuclear reactor;

a reaction chamber;

means for coupling said excited hydrogen to said reaction chamber;

means for coupling chloride to said reaction chamber, said hydrogen energizing said chloride in said reaction chamber to thereby cause said hydrogen and chloride to form a high temperature, high pressure hydrogen halide plasma;

means for converting said high temperature, high pressure hydrogen halide plasma to electromechanical energy;

means for disassociating said hydrogen halide to form molecular hydrogen and chloride, said molecular chloride being coupled back to said reactor chamber in a closed loop; and means for coupling said hydrogen back to said gaseous core nuclear reactor in a closed loop.

6. A method of generating power comprising:

passing helium through a gaseous core nuclear reactor, said helium being excited and forming alpha particles by high frequency radiation from the core of said gaseous core nuclear reactor;

coupling said excited helium and alpha particles to a reaction chamber;

coupling chlorine and hydrogen to said reaction chamber, said helium and alpha particles energizing said chlorine and hydrogen in said reaction chamber to thereby cause said hydrogen and chlorine to form a high temperature, high pressure hydrogen chloride plasma;

converting said high temperature, high pressure hydrogen chloride plasma, to electromechanical energy;

separating said helium from said hydrogen chloride;

coupling said helium back to said gaseous core nuclear reactor in a closed loop; and disassociating said hydrogen chloride to form molecular hydrogen and chlorine, said molecular hydrogen and chlorine being coupled back to said reaction chamber in a closed loop.

7. A method of generating power comprising:

passing helium through a gaseous core nuclear reactor, said helium being excited and forming alpha particles by high frequency radiation from the core of said gaseous core nuclear reactor;

coupling said excited helium and alpha particles to a reaction chamber;

coupling a halogen and hydrogen to said reaction chamber, said helium and alpha particles energizing said halogen and hydrogen in said reaction chamber to thereby cause said hydrogen and halogen to form a high temperature, high pressure hydrogen halide plasma;

converting said high temperature, high pressure hydrogen halide plasma, to electromechanical energy;

separating said helium from said hydrogen halide;

coupling said helium back to said gaseous core nuclear reactor in a closed loop; and disassociating said hydrogen halide to form molecular hydrogen and halogen, said molecular hydrogen and halogen being coupled back to said reaction chamber in a closed loop.

* * * * *